US012623319B2

(12) United States Patent
Nick et al.

(10) Patent No.: US 12,623,319 B2
(45) **Date of Patent: *May 12, 2026**

(54) RATCHETING TOOL

(71) Applicant: MILWAUKEE ELECTRIC TOOL CORPORATION, Brookfield, WI (US)

(72) Inventors: Mackenzie J. Nick, Theresa, WI (US); Jeffrey M. Wackwitz, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 301 days.

This patent is subject to a terminal disclaimer.

(21) Appl. No.: 18/207,261

(22) Filed: Jun. 8, 2023

(65) Prior Publication Data

US 2023/0330821 A1 Oct. 19, 2023

Related U.S. Application Data

(63) Continuation of application No. 16/658,657, filed on Oct. 21, 2019, now Pat. No. 11,712,787.

(Continued)

(51) Int. Cl.
*B25B 21/00* (2006.01)

(52) U.S. Cl.
CPC .......... *B25B 21/004* (2013.01); *B25B 21/002* (2013.01)

(58) Field of Classification Search
CPC ..... B25B 21/00; B25B 21/002; B25B 21/004; B25B 13/463; B25B 13/48; B25B 13/481
See application file for complete search history.

(56) References Cited

U.S. PATENT DOCUMENTS

| | | | |
|---|---|---|---|
| 2,542,323 | A | 2/1951 | Gearhart |
| 2,711,110 | A | 6/1955 | Brame |

(Continued)

FOREIGN PATENT DOCUMENTS

| | | | |
|---|---|---|---|
| CN | 201872126 | U | 6/2011 |
| DE | 202005018997 | U1 | 5/2006 |

(Continued)

OTHER PUBLICATIONS

International Search Report and Written Opinion for Application No. PCT/US2019/057189 dated Feb. 12, 2020 (11 bages).

(Continued)

*Primary Examiner* — David B. Thomas
(74) *Attorney, Agent, or Firm* — Michael Best & Friedrich LLP

(57) ABSTRACT

A powered ratchet tool includes a housing and an output member. The output member has an inner opening, an outer toothed surface, and an output member aperture extending through the outer toothed surface to the inner opening. The powered ratchet tool further includes a drive mechanism for driving the output member. The drive mechanism includes a yoke in which the output member is arranged. The yoke has a yoke aperture. The powered ratchet tool further includes a first pawl in the yoke that is biased toward the toothed surface of the output member and a second pawl in the yoke that is biased toward the toothed surface of the output member. When the output member is in a home position, the first pawl and the second pawl are engaged with the toothed surface of the output member and the output member aperture is aligned with the yoke aperture.

18 Claims, 7 Drawing Sheets

Related U.S. Application Data

(60) Provisional application No. 62/750,887, filed on Oct. 26, 2018.

(56) References Cited

U.S. PATENT DOCUMENTS

| | | | | | |
|---|---|---|---|---|---|
| 2,711,111 | A | | 6/1955 | Brame | |
| 3,257,877 | A | * | 6/1966 | Ulrich et al. | B25B 21/002 81/57.13 |
| 3,535,960 | A | * | 10/1970 | Borries | B25B 21/002 81/57.14 |
| 3,602,071 | A | | 8/1971 | Juhasz | |
| 4,064,722 | A | | 12/1977 | Wolski | |
| 4,993,288 | A | | 2/1991 | Anderson et al. | |
| 5,355,751 | A | * | 10/1994 | Specht | B25B 23/147 81/57.3 |
| 5,450,773 | A | | 9/1995 | Darrah et al. | |
| 5,626,062 | A | | 5/1997 | Colvin | |
| 5,697,266 | A | * | 12/1997 | Wilson, Jr. | B25B 13/461 81/57.3 |
| 6,142,277 | A | | 11/2000 | Barnett et al. | |
| 6,282,990 | B1 | | 9/2001 | Miner | |
| 6,330,842 | B1 | | 12/2001 | Brun | |
| 6,615,693 | B1 | | 9/2003 | Liao | |
| 6,769,330 | B2 | | 8/2004 | Chang | |
| 7,069,818 | B1 | | 7/2006 | Huang | |
| 7,121,167 | B1 | | 10/2006 | Miner | |
| 9,079,296 | B1 | | 7/2015 | Martucci | |
| 9,993,911 | B1 | * | 6/2018 | Santangelo | B25B 23/12 |
| 11,712,787 | B2 | * | 8/2023 | Nick | B25B 21/004 81/57.11 |
| 2007/0107560 | A1 | | 5/2007 | Chiang | |
| 2009/0205848 | A1 | | 8/2009 | Wilson, Jr. et al. | |
| 2014/0182420 | A1 | | 7/2014 | Chen et al. | |
| 2014/0327382 | A1 | | 11/2014 | Fair et al. | |
| 2020/0122304 | A1 | | 4/2020 | Chu | |

FOREIGN PATENT DOCUMENTS

| | | | |
|---|---|---|---|
| EP | 3505301 | A1 | 7/2019 |
| WO | 2017153629 | A1 | 9/2017 |
| WO | 2017173529 | A1 | 10/2017 |

OTHER PUBLICATIONS

Partial Supplementary European Search Report for Application No. 19875098.6 dated Jun. 24, 2022 (12 pages).

* cited by examiner

RATCHETING TOOL

CROSS-REFERENCE TO RELATED APPLICATIONS

This application is a continuation of U.S. patent application Ser. No. 16/658,657 filed on Oct. 21, 2019, now U.S. Pat. No. 11,712,787, which claims priority to U.S. Provisional Patent Application No. 62/750,887 filed on Oct. 26, 2018, the entire contents of each of which are incorporated by reference herein.

FIELD OF THE INVENTION

The present invention relates to ratchet tools, and more particularly to powered ratcheting tools.

BACKGROUND OF THE INVENTION

Powered ratchet tools sometimes allow an operator to drive an output member in a forward direction or an opposite reverse direction to apply torque to a fastener for tightening or loosening the fastener. Powered ratchet tools are typically powered by an electrical source, such as a DC battery, a conventional AC source, or pressurized air. Powered ratchet tools are constructed of components such as a drive mechanism including a motor and an output member for applying torque to the fastener.

SUMMARY OF THE INVENTION

The present invention provides, in one aspect, a powered ratchet tool comprising a housing and an output member having an inner opening, an outer toothed surface, and an output member aperture extending through the outer toothed surface to the inner opening. The powered ratchet tool further comprises a drive mechanism for driving the output member. The drive mechanism includes a yoke in which the output member is arranged. The yoke has a yoke aperture. The powered ratchet tool further comprises a first pawl in the yoke that is biased toward the toothed surface of the output member and a second pawl in the yoke that is biased toward the toothed surface of the output member. The powered ratchet further includes a first actuator configured to activate the drive mechanism when the first actuator is actuated and a controller configured to activate and deactivate the drive mechanism, wherein upon actuation and release of the first actuator, if the output member is not in the home position, the controller is configured to activate the drive mechanism until the output member has been driven to the home position. When the output member is in a home position, the first pawl and the second pawl are engaged with the toothed surface of the output member and the output member aperture is aligned with the yoke aperture.

The present invention provides, in another aspect, a method of operating a powered ratchet tool. The powered ratchet tool includes an output member with an output member aperture, a drive mechanism for driving the output member including a yoke with a yoke aperture, a first actuator configured to activate the drive mechanism, and a controller configured to activate and deactivate the drive mechanism. The method includes activating the drive mechanism with the first actuator to drive the output member, releasing the first actuator to deactivate the drive mechanism, sensing through the controller if the output member is in a home position, in which the output member aperture is aligned with the yoke aperture, and if the output member is not in the home position, activating the drive mechanism with the controller to drive the output member until the output member has been driven to the home position.

The present invention provides, in yet another aspect, a powered ratchet tool including a housing having a housing aperture, an output member having an inner opening, an outer toothed surface, and an output member aperture extending through the outer toothed surface to the inner opening, and a drive mechanism for driving the output member. The drive mechanism includes a motor and a transmission having a drive gear to transmit torque from the motor to the output member. When the output member is in a home position, the output member aperture is aligned with the housing aperture.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
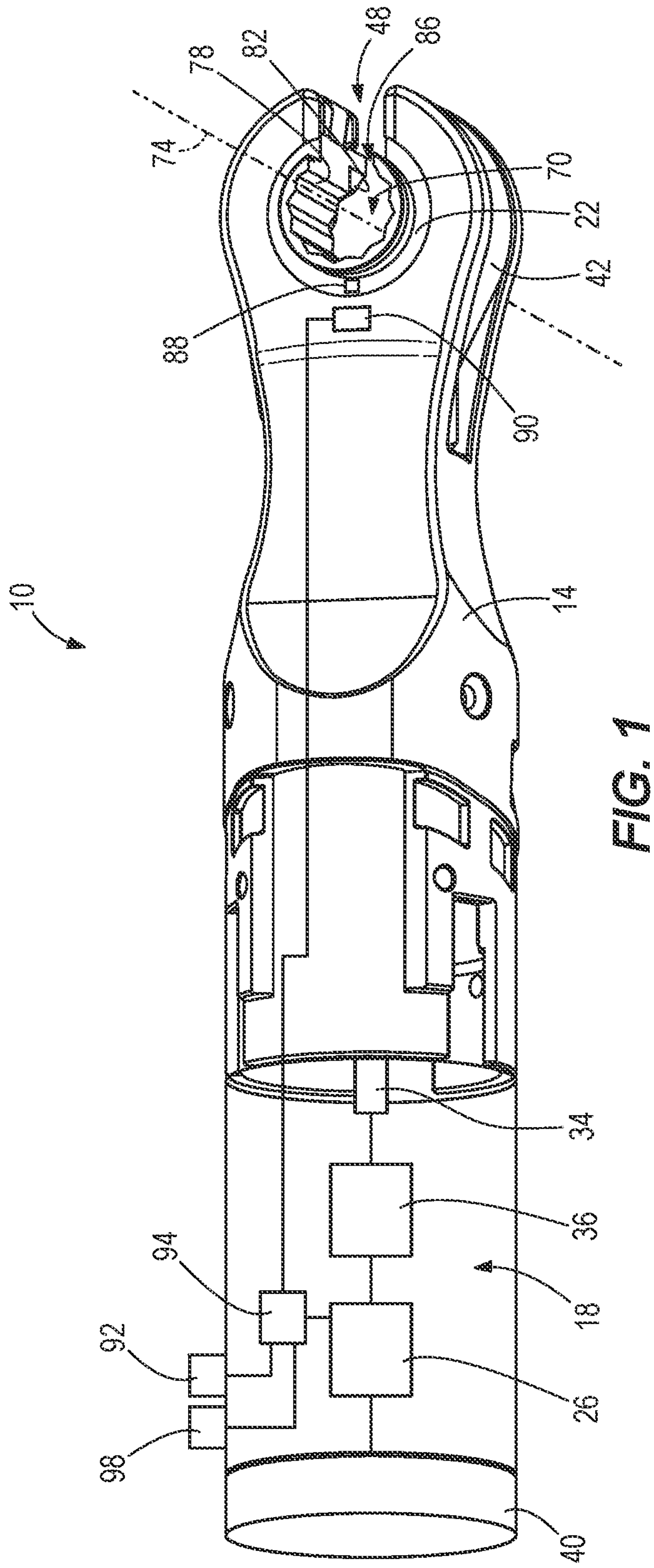
FIG. 1 is a perspective view of a ratchet tool in accordance with an embodiment of the invention.
Figure 2:
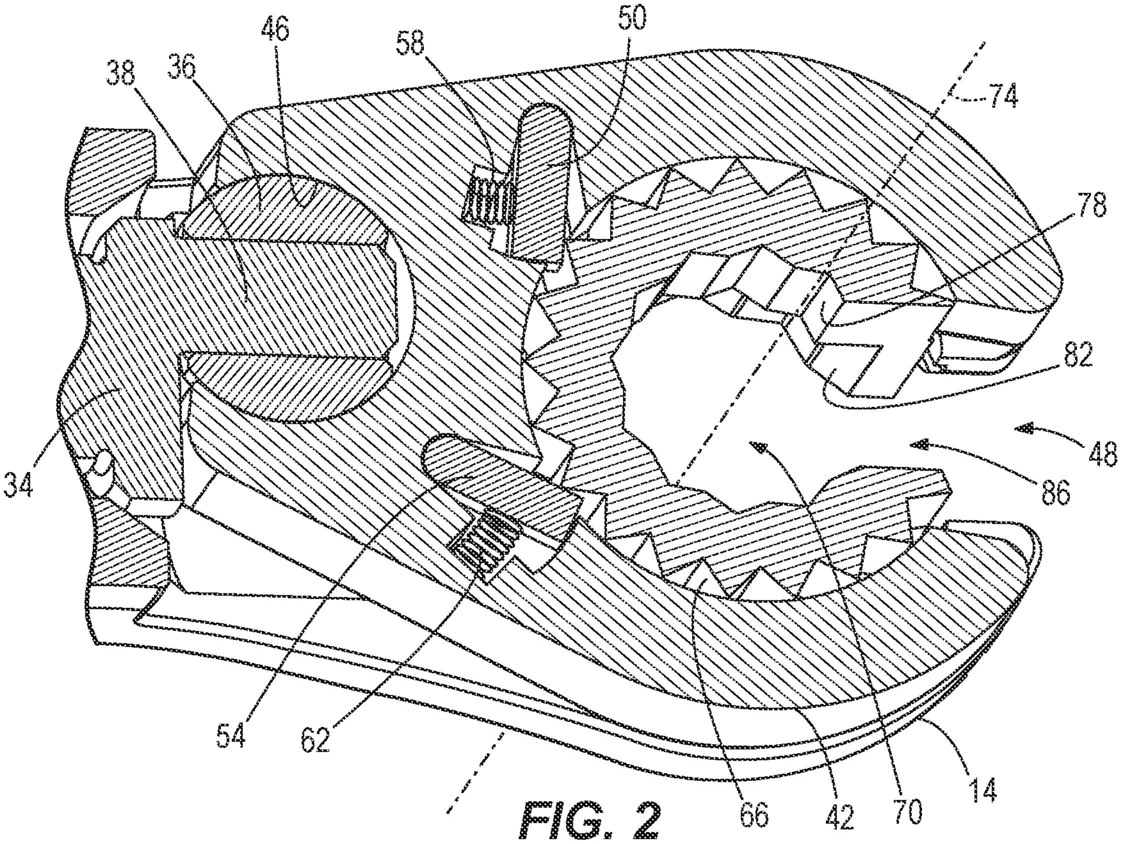
FIG. 2 is a cross-sectional view of the ratchet tool of FIG. 1.

A shown in FIG. 1, a powered ratchet tool 10 includes a housing 14 and a drive mechanism 18 for driving an output member 22, such as a socket driver used to tighten or loosen fasteners (e.g., nuts or bolts). As shown in FIG. 2, the drive mechanism 18 includes a motor 26 and a transmission 30 terminating in a crankshaft 34 having a drive bushing 36 arranged eccentrically on an end 38 of the crankshaft 34. The motor 26 is powered by a removable and rechargeable battery pack 40. The drive mechanism 18 also includes a yoke 42 through which the output member 22 extends. The yoke 42 has a recess 46 (FIG. 2) in which the drive bushing 36 is arranged and a yoke aperture 48 giving the yoke 42 a C-shape. As explained in further detail below, when the crankshaft 34 rotates, the drive bushing 36 pivots the yoke 42 in a reciprocating manner, relative to the housing 14, to drive the output member 22.

With reference to FIG. 2, the ratchet tool 10 also includes a first pawl 50 and a second pawl 54 in the yoke 42. The first and second pawls 50, 54 are biased by first and second springs 58, 62, respectively, toward an outer toothed surface 66 of the output member 22. The output member 22 also has an inner opening 70 defining a longitudinal axis 74. The inner opening 70 includes a first end section 78 with a first size and a first shape, such as a 12-point double hexagon shape, and a second end section 82 with a second size and a second shape. In the illustrated embodiment, the second size is larger than the first size and the second shape is also a 12-point double hexagon shape, but in other embodiments, the second size can be smaller and the second shape can be different than the first shape. The first end section 78 is configured to receive a fastener or an insert having a corresponding shape and size. Likewise, the second end section 82 is configured to receive a fastener or an insert having a corresponding shape and size. In some embodiments, the first size is the same as the second size and the first shape is the same as the second shape.

Figure 3:
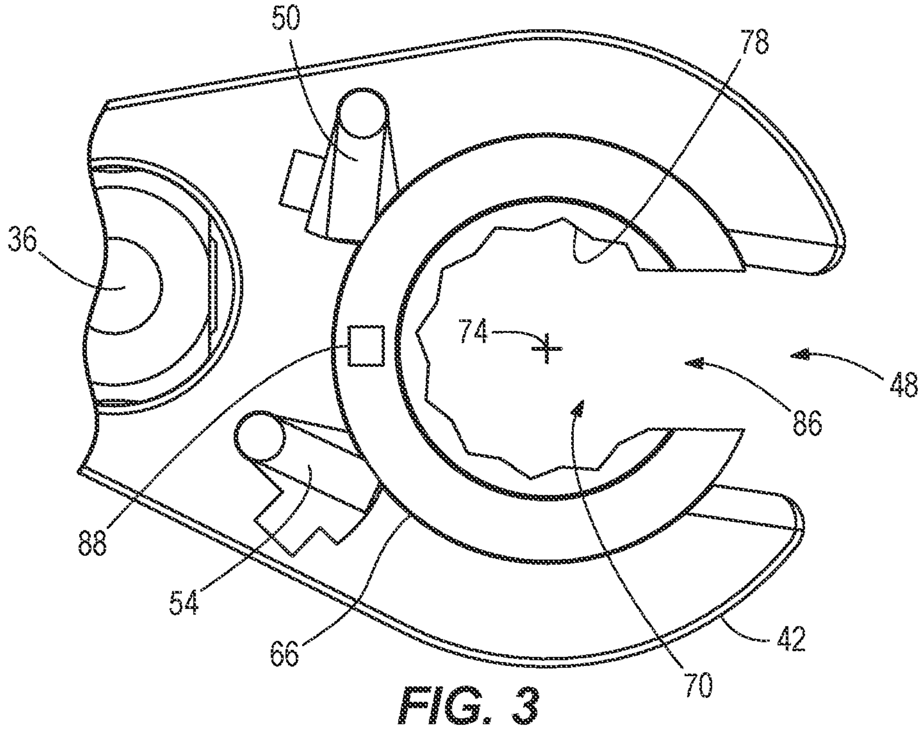
FIG. 3 is a plan view of the ratchet tool of FIG. 1, with portions removed and an output member in a home position.

With reference to FIGS. 1-5, the output member 22 also includes an output member aperture 86 extending through the outer toothed surface 66 to the inner opening 70. As shown in FIGS. 1-3, when the output member 22 is in a "home" position, the output member aperture 86 is aligned with the yoke aperture 48, creating a passage allowing a fastener or nut to be moved horizontally (i.e., transverse to the axis 74) through the apertures 48, 86 and into the inner opening 70 of the output member 22. In some embodiments, the output member 22 includes a magnet 88 (FIG. 1) that is detectable by a sensor 90 on the housing 14 of the ratchet tool 10, such as a Hall-effect sensor, when the output member 22 is in the home position.

As shown in FIG. 1, the ratchet tool 10 includes a first actuator 92 in communication with a controller 94. In some embodiments, the ratchet tool 10 includes a second actuator 98 in communication with the controller 94. The controller 94 is in communication with the motor 26 and is thus configured to activate and deactivate the drive mechanism 18, as explained in further detail below.

In operation, with the output member 22 in the home position, when an operator wishes to loosen a fastener or nut in a hard to reach location, such as a vertically narrow crevice, the operator moves the tool 14 horizontally into the crevice such that the shank of the fastener to which the nut or fastener head is attached passes through yoke aperture 48 and the output member aperture 86, and into the inner opening 70. Once the shank is received in the inner opening 70 and aligned with the longitudinal axis 74, the operator moves the output member 22 along the longitudinal axis 74 and the shank until the second end section 82 engages the nut or fastener head. The operator then actuates and holds the first actuator 92 and in response, the controller 94 activates the motor 26 of the drive mechanism 18, causing the crankshaft 34 to rotate the drive bushing 36, which causes the yoke 42 to pivot in a reciprocating manner relative to the housing 14.

Initially, as the yoke 42 is undergoing a "driving" pivot motion (pivoting counterclockwise as viewed in FIG. 3 about the longitudinal axis 74), both the first pawl 50 and second pawl 54 engage the toothed surface 66 of the output member 22. Thus, torque is transferred from the yoke 42 to the output member 22 by both the first and second pawls 50, 54, causing the output member 22 to rotate counterclockwise about the longitudinal axis 74, as viewed in FIG. 3. As the crankshaft 34 continues to rotate the drive bushing 36, the yoke 42 undergoes a "ratcheting" pivot motion (pivoting clockwise as viewed in FIG. 3 about the longitudinal axis 74), causing the first pawl 50 and the second pawl 54 to ratchet back across the toothed surface 66 of the output member 22, thus not transferring any torque to the output member 22. After completing the "ratcheting" pivot motion, the yoke 42 continues to perform a series of subsequent "driving" and "ratcheting" pivot motions to loosen the fastener or nut via the output member 22.

Figure 4:
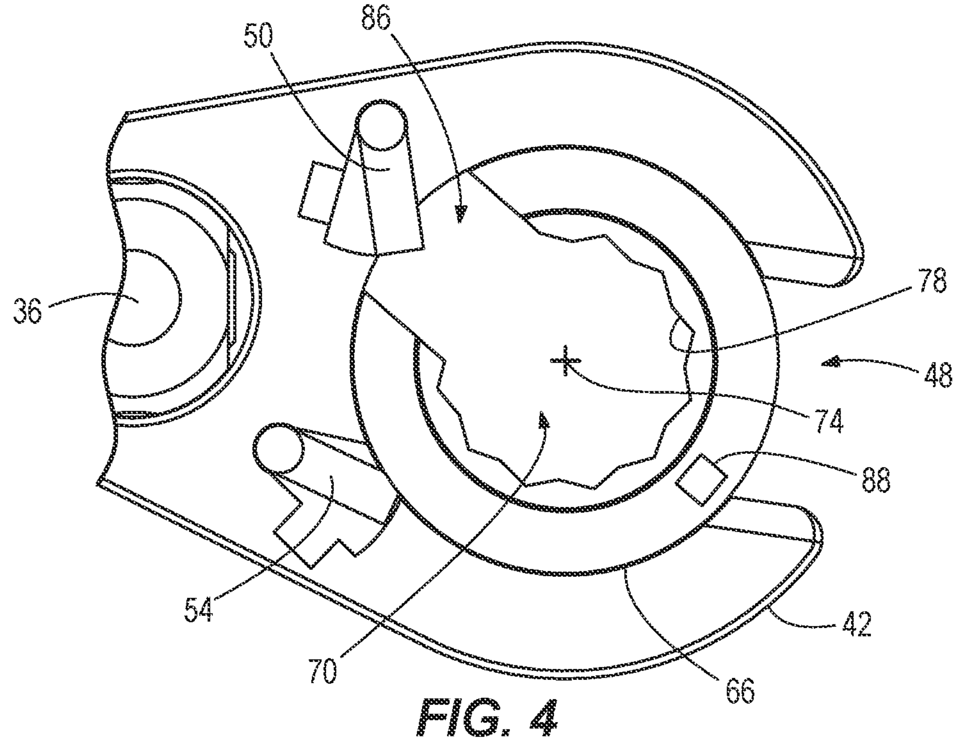
FIG. 4 is a plan view of the ratchet tool of FIG. 1, with portions removed and an output member in a second position.

Eventually the output member 22 is rotated to a second position shown in FIG. 4, in which the output member aperture 86 is aligned with the first pawl 50. While the output member 22 is in the second position, the first pawl 50 is not engaged with toothed surface 66 and thus cannot transfer any torque to the output member 22 during a "driving" pivot motion of the yoke 42. However, while the output member 22 is in the second position, the second pawl 54 is engaged with the toothed surface 66 and thus is able to transfer torque to the output member 22 during a "driving" pivot motion of the yoke.

Figure 5:
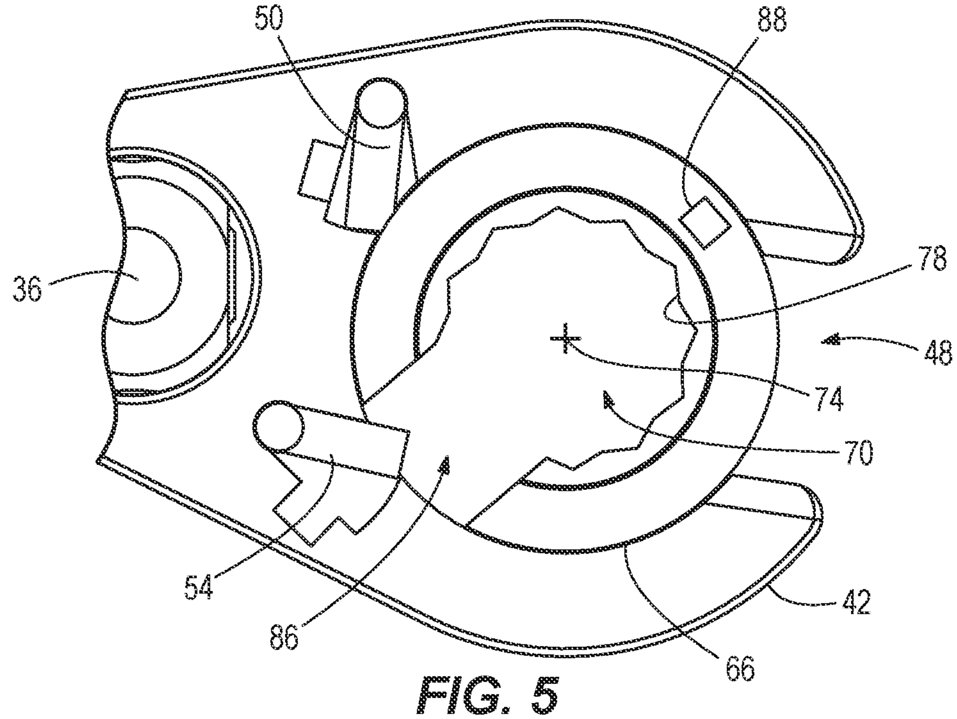
FIG. 5 is a plan view of the ratchet tool of FIG. 1, with portions removed and an output member in a third position.

Subsequently, the output member 22 is rotated to a third position shown in FIG. 5, in which the output member aperture 86 is aligned with the second pawl 54. While output member 22 is in the third position, the second pawl 54 is not engaged with toothed surface 66 and thus cannot transfer any torque to the output member 22 during a "driving" pivot motion of the yoke 42. However, while the output member 22 is in the third position, the first pawl 50 is engaged with the toothed surface 66 and thus is able to transfer torque to the output member 22 during a "driving" pivot motion of the yoke. Once the fastener or nut has been loosened, the operator may remove the tool 10 from the fastener and release the first actuator 92.

In some embodiments, after releasing the first actuator 92, the controller 94 recognizes that the output member 22 is not in the home position because the magnet 88 is not detected by the sensor 90. Thus, in response to recognizing the output member 22 is not in the home position, despite the first actuator 92 being released by the operator, the controller 94 maintains the drive mechanism 18 in an activated state to continue rotating the output member 22, as described above, until the output member 22 is in the home position. When the output member 22 reaches the home position, the sensor 90 detects the magnet 88 and in response, the controller 84 deactivates the drive mechanism 18.

In other embodiments, after releasing the first actuator 92, the drive mechanism 18 is deactivated 18. The operator then actuates and holds the second actuator 98. In response to actuation of the second actuator 98, the controller 94 first determines whether the output member 22 is in the home position by determining whether the sensor 90 detects the magnet 88. If the controller 94 determines the output member 22 is not in the home position, the controller 94 activates the drive mechanism 18 to continue rotating the output member 22 until the output member 22 is in the home position. When the output member 22 reaches the home position, the sensor 90 detects the magnet 88 and in response, the controller 84 deactivates the drive mechanism 18, even if the operator continues to hold the second actuator 98. Thereafter, the operator releases the second actuator 98.

In operation, when an operator wishes to tighten a fastener or nut, the operator must vertically flip the tool 10, such that the first end section 78 can engage the fastener or nut. The operator may then actuate and hold the first actuator 92 as described above until the fastener or nut has been tightened.

Figure 6:
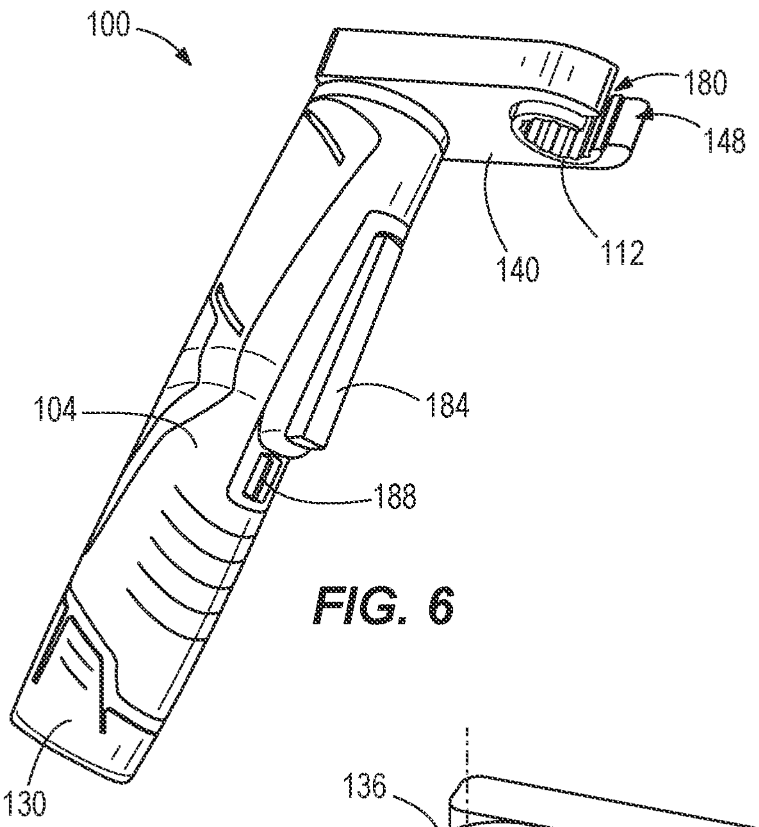
FIG. 6 is a perspective view of a ratchet tool in accordance with another embodiment of the invention.
Figure 7:
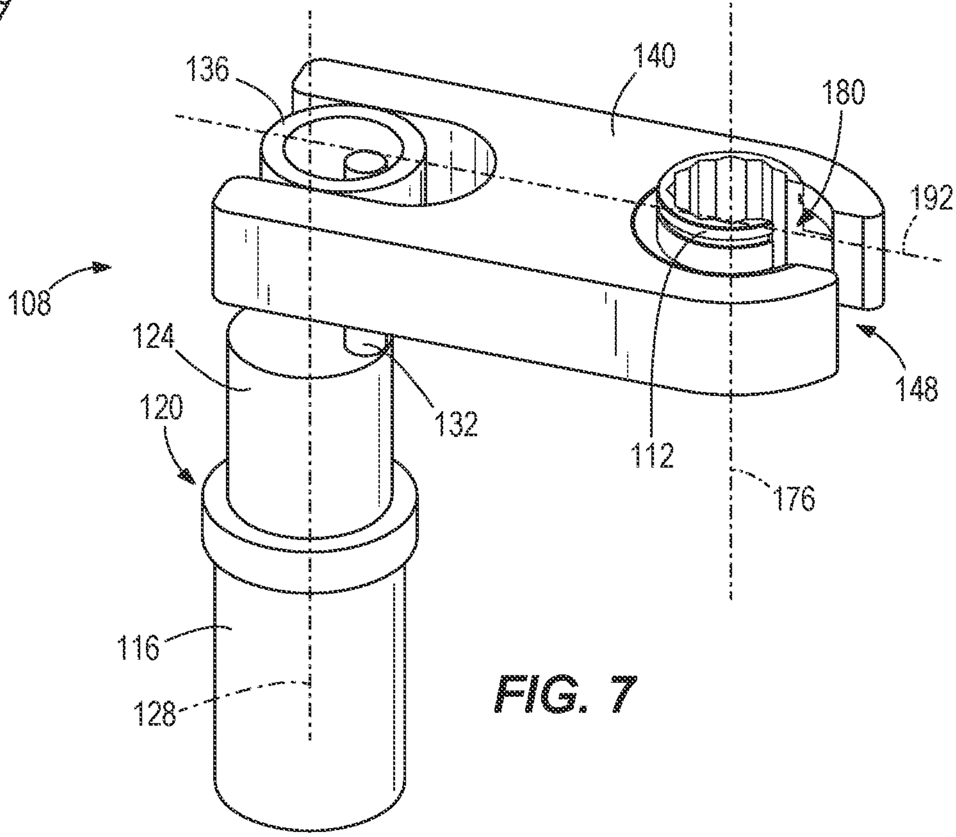
FIG. 7 is a perspective view of the ratchet tool of FIG. 6, with portions removed.
Figure 8:
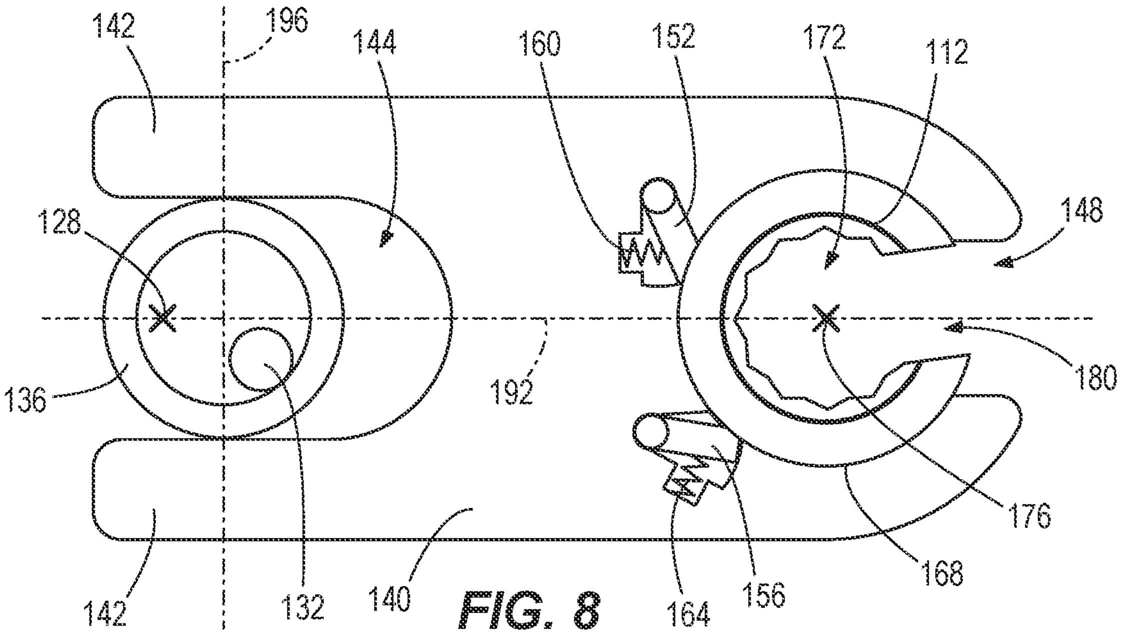
FIG. 8 is a plan view of the ratchet tool of FIG. 6, with portions removed.
Figure 9:
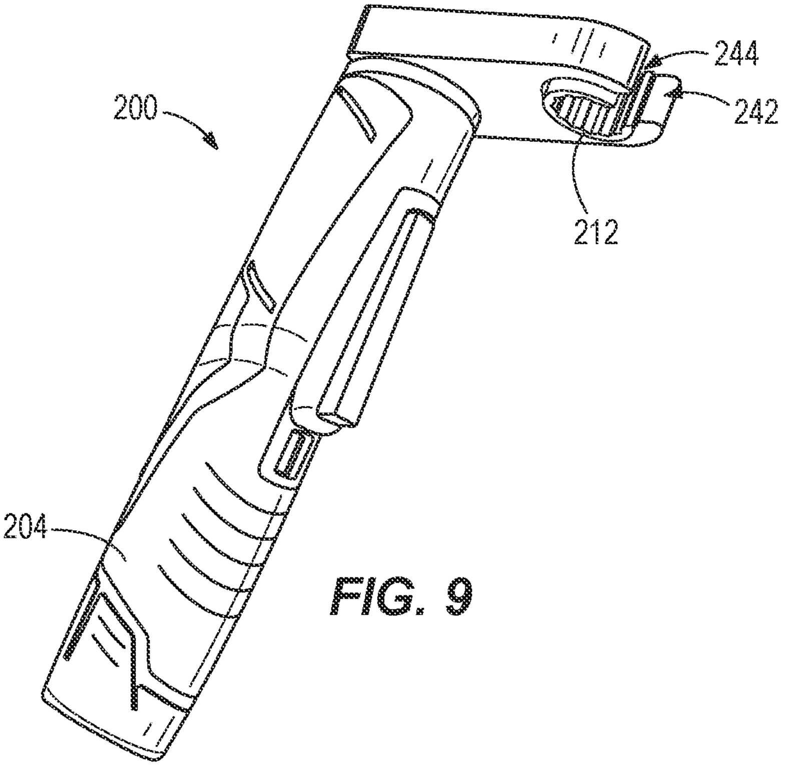
FIG. 9 is a perspective view of a ratchet tool in accordance with yet another embodiment of the invention.

FIGS. 6-8 illustrate another embodiment of a powered ratchet tool 100 including a housing 104, a drive mechanism 108 for driving an output member 112, such as a socket driver used to tighten or loosen fasteners (e.g., nuts or bolts). As shown in FIG. 7, the drive mechanism 108 includes a motor 116 and a transmission 120 terminating in a crankshaft 124 defining a crank axis 128. The motor 116 is powered by a removable and rechargeable battery pack 130. An eccentric 132 is eccentrically arranged on the crankshaft 124 and extends into a drive bushing 136. The drive mechanism 108 also includes a yoke 140 through which the output member 112 extends. The yoke 140 has parallel arms 142 (FIG. 8). Between the arms 142, a recess 144 is defined in which the drive bushing 136 is arranged. The yoke 140 also includes a yoke aperture 148 giving the yoke 140 a C-shape. As explained in further detail below, when the crankshaft 124 rotates, the drive bushing 136 pivots the yoke 140 in a reciprocating manner, relative to the housing 14, to drive the output member 112.

With reference to FIG. 8, the ratchet tool 100 also includes a first pawl 152 and a second pawl 156 in the yoke 140. The first and second pawls 152, 156 are biased by first and second springs 160, 164, respectively, toward an outer toothed surface 168 of the output member 112. The output member 112 also has an inner opening 172 defining a longitudinal axis 176 that is parallel to the crank axis 128. The inner opening 172 is similar to the inner opening 70 of ratchet tool 10. The output member 112 also includes an output member aperture 180 extending through the outer toothed surface 168 to the inner opening 172. As shown in FIGS. 6-8, when the output member is in a "home" position, the output member aperture 180 is aligned with the yoke aperture 148, creating a passage allowing the shank of a fastener to which a nut or fastener head is attached to be moved through the apertures 148, 180 and into the inner opening 172 of the output member 112.

Like the ratchet tool 10, in some embodiments, the output member 112 includes a magnet that is detectable by a sensor on the housing 104 of the ratchet tool 100, such as a Hall-effect sensor, when the output member 112 is in the home position. Like the ratchet tool 10, in some embodiments, the ratchet tool 100 includes a first actuator 184, a second actuator 188, and a controller that have the same functions as the first actuator 92, second actuator 98 and controller 84 of the ratchet tool 10. The magnet, sensor, first actuator 184, second actuator 188, and controller of the ratchet tool 100 can all work together in the same way as described above with the ratchet tool 10.

The ratchet tool 100 is operable in the same manner as the ratchet tool 10, except for the following differences explained below. When the drive mechanism 108 is activated, the crankshaft 124 rotates about the crank axis 128, causing the eccentric 132 to rotate about the crank axis 128 in a manner that eccentrically drives the drive bushing 136 within the recess 144 of the yoke 140. Specifically, in response to the driving motion of the eccentric 132, the drive bushing 136 has two orthogonal components of motion, along a first axis 192 that is parallel to the two arms 142 and intersects the crank axis 128 and longitudinal axis 176, and along a second axis 196 that is perpendicular to the first axis 192. As shown in FIG. 8, the crank axis 128 does not intersect the second axis 196. As the eccentric 132 is rotated, movement is imparted to the drive bushing 136 having components along both of the first and second axes 192, 196. The component of the bushing's motion along the first axis 192 does not apply a moment to the yoke 140. However, the component of the bushing's motion along the second axis 196 alternatively contacts one of the two arms 142, thus causing the yoke 140 to pivot in a reciprocating manner about the longitudinal axis 176 and relative to the housing 104, thus driving the output member 112 in a similar manner to the yoke 42 driving the output member 22 of the ratchet tool 10.

Figure 10:
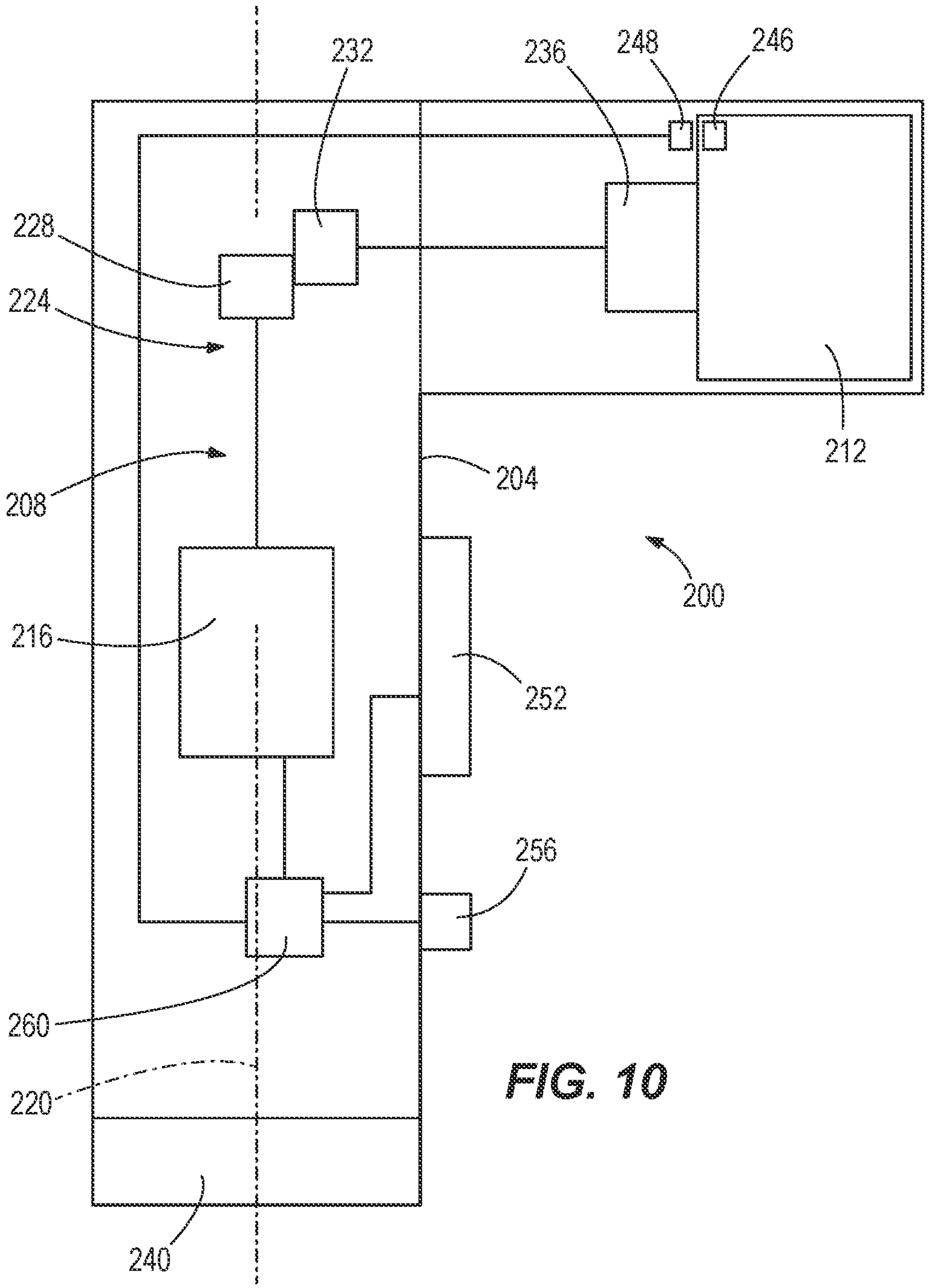
FIG. 10 is a schematic view of the ratchet tool of FIG. 9.
Figure 11:
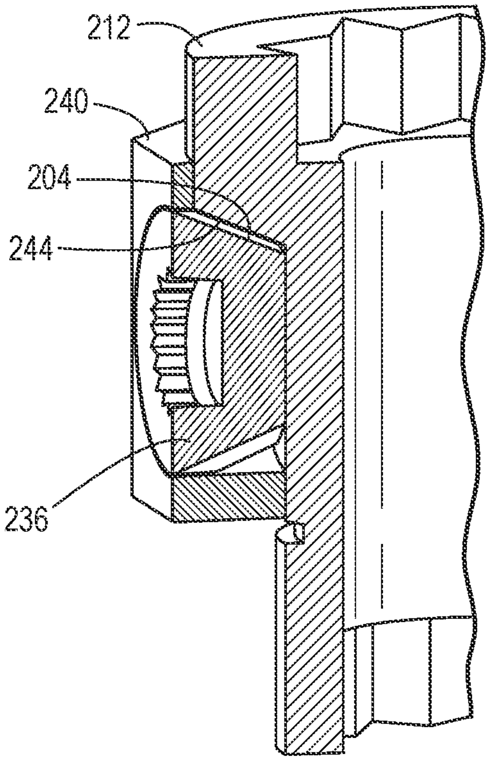
FIG. 11 is a cross-sectional view of the ratchet tool of FIG. 9, with portions removed.
Figure 12:
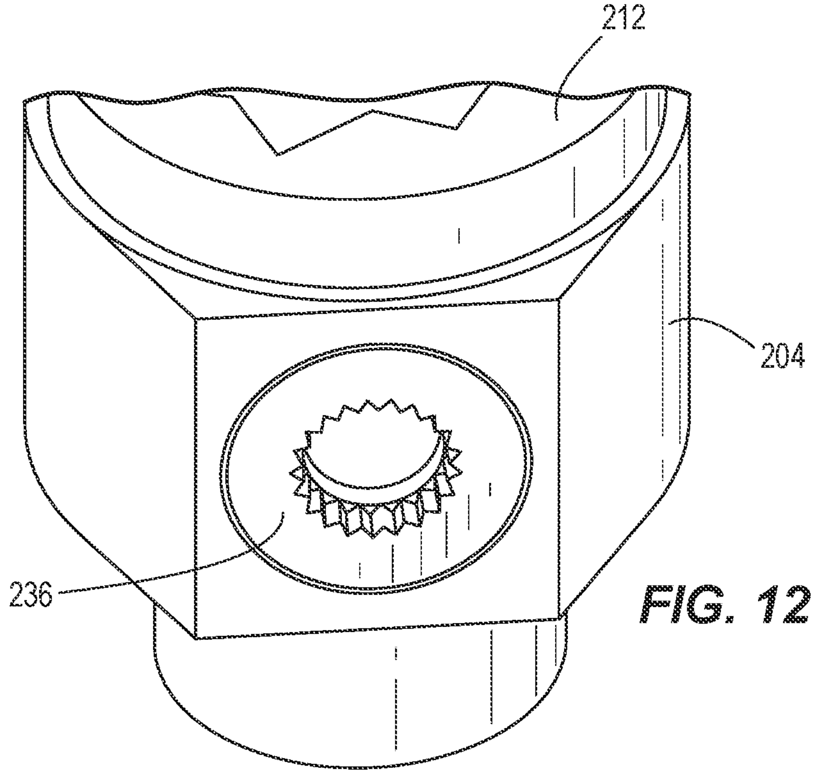
FIG. 12 is a perspective view of the ratchet tool of FIG. 9, with portions removed.

FIGS. 9-12 illustrate another embodiment of a powered ratchet tool 200 including a housing 204 and a drive mechanism 208 for driving an output member 212, such as a socket driver used to tighten or loosen fasteners (e.g., nuts or bolts). As shown in FIG. 10, the drive mechanism 208 includes a motor 216 having a drive axis 220 and a transmission 224. The transmission 224 includes a first gear 228, such as a bevel gear, a second gear 232, such as another bevel gear, and a drive gear 236 to drive the output member 212. Specifically, the drive gear 236 has teeth 240 that are engaged with a driven ring 244 of the output member 212. Unlike the powered ratchet tools 10, 100, the powered ratchet tool 200 does not include a ratchet mechanism. The drive gear 236 drives the output member 212 in a tightening or loosening direction depending on the rotational direction of the motor 216. The motor 216 is powered by a removable and rechargeable battery pack 240. The output member 212 has an output aperture 242 and the housing 204 has a housing aperture 244, giving both a C-shape. When the output aperture 244 is aligned with the housing aperture 244, the output member 212 is in the home position.

Like the ratchet tools 10 and 100, in some embodiments, the output member 212 includes a magnet 246 that is detectable by a sensor 248 on the housing 204 of the ratchet tool 200, such as a Hall-effect sensor, when the output member 212 is in the home position. Like the ratchet tools 10 and 100, in some embodiments, the ratchet tool 200 includes a first actuator 252, a second actuator 256, and a controller 260 that have the same functions as the first actuators 92, 184, second actuator 98, 188 and controllers of the ratchet tools 10, 100. The magnet 246, sensor 248, first actuator 252, second actuator 256, and controller 260 of the ratchet tool 200 can all work together in the same way as described above with the ratchet tools 10, 100.

Various features of the disclosure are set forth in the following claims.

What is claimed is:

1. A powered ratchet tool comprising:

a housing;

an output member having an inner opening, an outer toothed surface, and an output member aperture extending through the outer toothed surface to the inner opening;

a drive mechanism for driving the output member, the drive mechanism including a yoke in which the output member is arranged, the yoke having a yoke aperture;

a first pawl in the yoke that is biased toward the toothed surface of the output member;

a second pawl in the yoke that is biased toward the toothed surface of the output member;

a first actuator configured to activate the drive mechanism when the first actuator is actuated; and a controller configured to activate and deactivate the drive mechanism, wherein when the output member is in a home position, the first pawl and the second pawl are engaged with the toothed surface of the output member and the output member aperture is aligned with the yoke aperture, wherein upon actuation and release of the first actuator, if the output member is not in the home position, the controller is configured to activate the drive mechanism until the output member has been driven to the home position.

2. The powered ratchet tool of claim 1, wherein when the output member is in a second position that is different from the home position, the second pawl is engaged with the toothed surface of the output member and the output member aperture is aligned with the first pawl, such that the first pawl does not engage with the toothed surface of the output member.

3. The powered ratchet tool of claim 2, wherein when the output member is in a third position that is different from the home position and the second position, the first pawl is engaged with the toothed surface of the output member, the output member aperture is aligned with the second pawl, such that the second pawl does not engage with the toothed surface of the output member.

4. The powered ratchet tool of claim 1, further comprising a sensor and a magnet, the magnet being coupled to the output member, wherein the sensor is configured to detect the magnet when the output member is in the home position, such that in response to the sensor detecting the magnet and release of the first actuator, the drive mechanism is deactivated by the controller.

5. The powered ratchet tool of claim 1, further comprising a second actuator, and wherein upon actuation and release of the first actuator, if the output member is not in the home position, the second actuator is actuatable to activate the drive mechanism until the output member has been driven to the home position.

6. The powered ratchet tool of claim 5, further comprising a sensor and a magnet, the magnet being coupled to the output member, wherein the sensor is configured to detect the magnet when the output member is in the home position, such that in response to the sensor detecting the magnet, the drive mechanism is deactivated even if the second actuator remains actuated.

7. The powered ratchet tool of claim 1, wherein the drive mechanism includes a motor and a transmission driven by the motor and terminating in a crankshaft having a drive bushing arranged eccentrically on an end of the crankshaft, wherein the drive bushing is arranged in a recess of the yoke, such that in response to the motor driving the transmission, the crankshaft rotates and the drive bushing pivots the yoke in a reciprocating manner relative to the housing to drive the output member.

8. The powered ratchet tool of claim 1, wherein the inner opening of the output member has a first end section with a first size and a first shape and a second end section with a second size and a second shape.

9. The powered ratchet tool of claim 8, wherein the first shape is the same as the second shape and the first size is different from the second size.

10. The powered ratchet tool of claim 8, wherein the first shape is the same as the second shape and the first size is the same as the second size.

11. The powered ratchet tool of claim 8, wherein the first shape is the different from the second shape.

12. A method of operating a powered ratchet tool, the powered ratchet tool including an output member with an output member aperture, a drive mechanism for driving the output member including a yoke with a yoke aperture, a first actuator configured to activate the drive mechanism, and a controller configured to activate and deactivate the drive mechanism, the method comprising:

activating the drive mechanism with the first actuator to drive the output member;

releasing the first actuator to deactivate the drive mechanism;

sensing through the controller if the output member is in a home position, in which the output member aperture is aligned with the yoke aperture; and if the output member is not in the home position, activating the drive mechanism with the controller to drive the output member until the output member has been driven to the home position.

13. The method of claim 12, wherein sensing through the controller further includes sensing a position of a magnet coupled to the output member to determine whether the output member is in the home position.

14. The method of claim 12, further comprising deactivating the drive mechanism with the controller when the output member returns to the home position.

15. A powered ratchet tool comprising:

a housing having a housing aperture;

an output member having an inner opening, an outer toothed surface, and an output member aperture extending through the outer toothed surface to the inner opening;

a drive mechanism for driving the output member, the drive mechanism including a motor, and a transmission having a drive gear to transmit torque from the motor to the output member;

wherein when the output member is in a home position, the output member aperture is aligned with the housing aperture;

a first actuator configured to activate the drive mechanism when the first actuator is actuated; and a controller configured to activate and deactivate the drive mechanism, wherein upon actuation and release of the first actuator, if the output member is not in the home position, the controller is configured to activate the drive mechanism until the output member has been driven to the home position.

16. The powered ratchet tool of claim 15, further comprising a sensor and a magnet, the magnet being coupled to the output member, wherein the sensor is configured to detect the magnet when the output member is in the home position, such that in response to the sensor detecting the magnet and release of the first actuator, the drive mechanism is deactivated by the controller.

17. The powered ratchet tool of claim 15, further comprising a second actuator, and wherein upon actuation and release of the first actuator, if the output member is not in the home position, the second actuator is actuatable to activate the drive mechanism until the output member has been driven to the home position.

18. The powered ratchet tool of claim 17, further comprising a sensor and a magnet, the magnet being coupled to the output member, wherein the sensor is configured to detect the magnet when the output member is in the home position, such that in response to the sensor detecting the magnet, the drive mechanism is deactivated even if the second actuator remains actuated.

* * * * *